US 8,525,777 B2

(12) United States Patent
Stavely et al.

(10) Patent No.: US 8,525,777 B2
(45) Date of Patent: Sep. 3, 2013

(54) TRACKING MOTION OF MOUSE ON SMOOTH SURFACES

(75) Inventors: Donald J. Stavely, Windsor, CO (US); David D. Bohn, Fort Collins, CO (US)

(73) Assignee: Microsoft Corporation, Redmond, WA (US)

( * ) Notice: Subject to any disclaimer, the term of this patent is extended or adjusted under 35 U.S.C. 154(b) by 729 days.

(21) Appl. No.: 12/547,417

(22) Filed: Aug. 25, 2009

(65) Prior Publication Data

US 2011/0050573 A1    Mar. 3, 2011

(51) Int. Cl.
*G06F 3/033*    (2013.01)

(52) U.S. Cl.
USPC .............................. 345/156; 345/166; 250/221

(58) Field of Classification Search
None
See application file for complete search history.

(56) References Cited

U.S. PATENT DOCUMENTS

| | | | | |
|---|---|---|---|---|
| 7,244,925 B2* | 7/2007 | Xie | | 250/221 |
| 7,443,154 B1 | 10/2008 | Merewether et al. | | |
| 7,459,671 B2 | 12/2008 | Trisnadi et al. | | |
| 7,460,107 B1* | 12/2008 | Bohn | | 345/166 |
| 7,474,767 B2 | 1/2009 | Sen et al. | | |
| 7,525,082 B2 | 4/2009 | Itagaki | | |
| 7,728,817 B2* | 6/2010 | Cheah et al. | | 345/166 |
| 7,825,895 B2* | 11/2010 | Bynum et al. | | 345/156 |
| 2005/0024336 A1* | 2/2005 | Xie et al. | | 345/166 |
| 2005/0156915 A1* | 7/2005 | Fisher | | 345/179 |
| 2005/0231482 A1* | 10/2005 | Theytaz et al. | | 345/166 |
| 2006/0091298 A1* | 5/2006 | Xie et al. | | 250/221 |
| 2006/0208170 A1* | 9/2006 | Xie | | 250/221 |
| 2007/0085859 A1 | 4/2007 | Xie | | |
| 2007/0236455 A1* | 10/2007 | Cheah et al. | | 345/166 |
| 2007/0296699 A1 | 12/2007 | Bohn et al. | | |
| 2009/0060283 A1 | 3/2009 | Bledsoe et al. | | |
| 2009/0102793 A1* | 4/2009 | Bohn et al. | | 345/166 |
| 2009/0108175 A1 | 4/2009 | Grot | | |
| 2009/0153486 A1* | 6/2009 | Bohn | | 345/166 |
| 2009/0160773 A1* | 6/2009 | Bohn et al. | | 345/166 |
| 2009/0207419 A1* | 8/2009 | Hwang et al. | | 356/521 |
| 2011/0254952 A1* | 10/2011 | Wagner | | 348/135 |

OTHER PUBLICATIONS

"Optical Technology for Optimal Performance", Retrieved at << http://www.logitech.com/lang/pdf/optical_white_paper_91_EN.pdf >>, 3 Pages, Mar. 19, 2001.
"Optical Technology", 2002-2008, Techware Labs, Retrieved at << http://www.techwarelabs.com/reviews/peripherals/logitech_mx300/index_2.shtml >>, 2 Pages.
"Optical Technology for Optimal Performance", Logitech, Retrieved at << ftp://ftp.logitech-europe.com/pub/support/textfiles/Optical%20White%20Paper%20Final.doc >>, Created Feb. 28, 2001, 4 pages.
"Optical Technology for Optimal Performance", Logitech, Retrieved at << http://www.logitech.com/lang/pdf/optical_white_paper_91_EN.pdf >>, Created Mar. 19, 2001, 4 pages.

* cited by examiner

*Primary Examiner* — Van Chow
(74) *Attorney, Agent, or Firm* — Alleman Hall McCoy Russell & Tuttle LLP (57) ABSTRACT

Embodiments are disclosed herein that are related to computer mice configured to track motion on smooth surfaces. For example, one disclosed embodiment provides an optical mouse comprising a light source configured to illuminate a tracking surface, an image sensor, and an array of lenses configured to superimpose a plurality of images of spatially different areas of the tracking surface onto the image sensor. The optical mouse further comprises a controller configured to receive a plurality of time-sequenced frames of image data from the image sensor, to detect motion of the mouse on the tracking surface from movement of one or more tracking features in the plurality of time-sequenced frames of image data, and to output a motion signal.

20 Claims, 5 Drawing Sheets

TRACKING MOTION OF MOUSE ON SMOOTH SURFACES

BACKGROUND

An optical computer mouse uses a light source and image sensor to detect mouse movement relative to an underlying tracking surface to allow a user to manipulate a location of a virtual pointer on a computing device display. Light from the light source is directed onto the tracking surface, and the image sensor is used to acquire a series of image of the tracking surface. Movement is tracked by tracking changes in the location(s) of one or more surface features identified in the images via a controller.

An optical mouse relies upon the presence of some degree of surface roughness to allow for the detection of tracking features on a surface. However, surfaces such as glass may not have enough surface roughness to allow motion to be reliably tracked. Various solutions to this problem have been proposed. For example, some proposed solutions may utilize a secondary device (e.g. a "puck") placed on a surface to allow tracking to be accomplished via triangulation. However, the use of such a secondary device may be inconvenient for a user, and add additional cost to such a mouse.

SUMMARY

Accordingly, various embodiments are disclosed herein that are related to computer mice configured to track motion on smooth surfaces, such as glass surfaces. For example, one disclosed embodiment provides an optical mouse comprising a light source configured to illuminate a tracking surface, an image sensor, an array of lenses configured to superimpose a plurality of images of spatially different areas of the tracking surface onto the image sensor, and a controller configured to receive a plurality of time-sequenced frames of image data from the image sensor, to detect motion of the mouse on the tracking surface from movement of one or more tracking features in the plurality of time-sequenced frames of image data, and to output a motion signal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
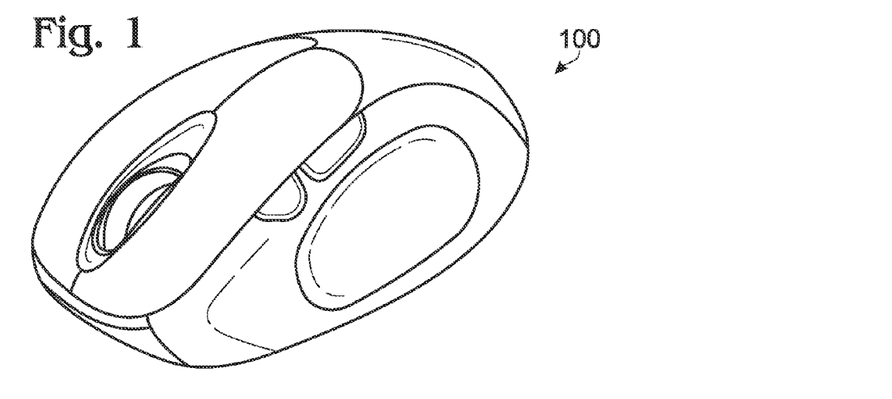
FIG. 1 shows an embodiment of an optical mouse.
Figure 2:
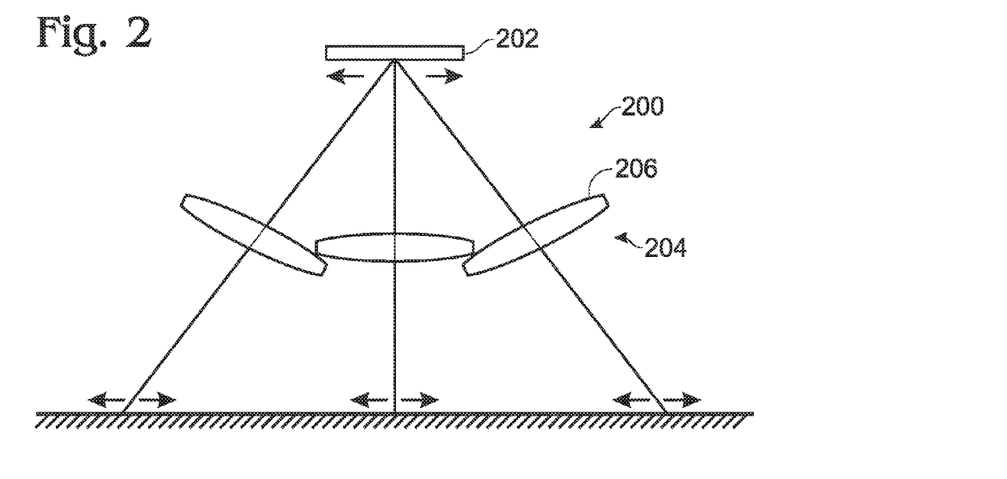
FIG. 2 shows a schematic depiction of an embodiment of an optical architecture for an optical mouse.

FIG. 1 depicts an embodiment of an optical mouse 100, and FIG. 2 shows a schematic depiction of an embodiment of an optical architecture 200 for an optical mouse. The optical architecture comprises an image sensor 202, and a lens array 204 comprising multiple lenses 206 configured to superimpose or overlay a plurality of images of spatially different regions of the tracking surface on the image sensor 202. In this manner, tracking features located in multiple spatially separate regions of the tracking surface are imaged as the image sensor 202 and lens array 204 move over the tracking surface. In the embodiment of FIG. 2, three lenses 206 are shown for the purpose of illustration, but it will be understood that a lens array according to the present disclosure may have any suitable number of lenses.

The overlay of images of spatially different areas of a tracking surface onto the image sensor 202 allows a larger area of the tracking surface to be imaged than where a single image of a tracking surface is focused onto an image sensor. In this manner, the sensor area is effectively multiplied by the number of lenses and overlapped images. This may facilitate the tracking of motion on surfaces that have a relatively low density of widely spaced tracking features, such as a glass surface used for conference tables and the like. It will be understood that, even after cleaning, a glass surface may have features that can be used to by optical mouse 100 to track motion, including but not limited to features such as dust, pits, scratches, etc. It will further be understood that the term "spatially different" as used herein signifies that two "spatially different" regions have at least some non-overlapping areas, and may be completely non-overlapping in some embodiments.

Figure 3:
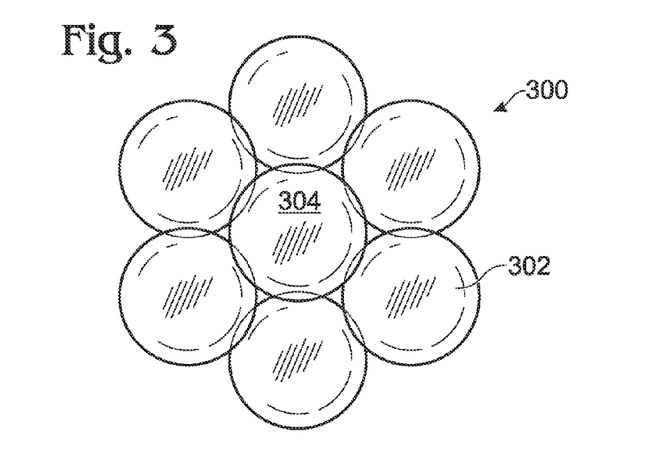
FIG. 3 shows a view of an example embodiment of a lens array for an optical mouse.
Figure 4:
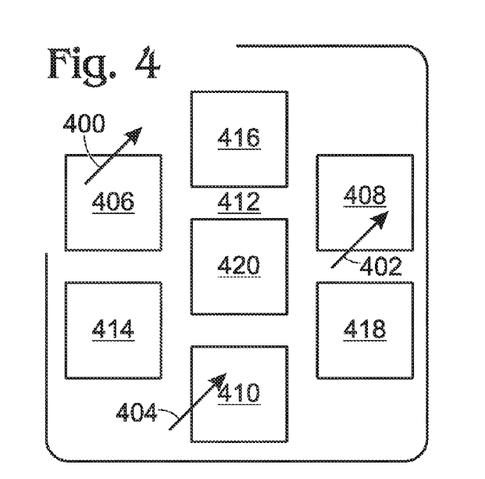
FIG. 4 shows a schematic depiction of tracking features moving across a plurality of images of spatially different areas of a tracking surface.
Figure 5:
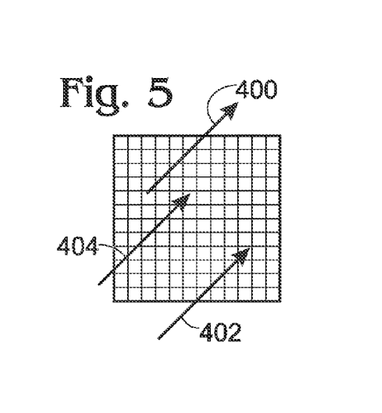
FIG. 5 shows a schematic depiction of a superposition of the plurality of images of FIG. 4 onto an image sensor to accumulate the tracking features in a single image data frame.

FIGS. 3-5 illustrate the imaging of tracking features using multiple lenses to focus multiple spatially different regions onto an image sensor. First, FIG. 3 shows an embodiment of a seven lens array 300 that may be used to focus seven images from seven spatially different regions of a tracking surface onto an image sensor. The seven lens array 300 comprises six peripherally arranged lenses, one of which is indicated at 302, surrounding a central lens 304. Next, FIG. 4 shows a schematic view of the locations and movement of three tracking features 400, 402 and 404 across three spatially different regions 406, 408, and 410, respectively, of a tracking surface 412. Four other spatially different regions of the tracking surface 412 are shown at 414, 416, 418 and 420, in which no tracking features are located. Using the seven lens array 300 of FIG. 3 to superimpose the seven spatially different regions of the tracking surface onto an image sensor and acquire a series of images yields the result shown in FIG. 5, in which motion of the three tracking features 400, 402 and 404 can be tracked across the image sensor via superimposed images.

In comparison, if a single region of the tracking surface is imaged, such as region 414, no tracking features would appear in the acquired image, thereby making the sensing of motion across the surface difficult. Thus, by utilizing multiple lenses to superimpose images of multiple spatially different regions of a tracking surface, widely spaced tracking features can be imaged via a conventional mouse image sensor, using conventional tracking algorithms, for tracking. Further, this may be accomplished without any loss of image sensor resolution, as opposed to the imaging of a larger tracking surface area by decreasing the magnification of a single lens.

Figure 6:
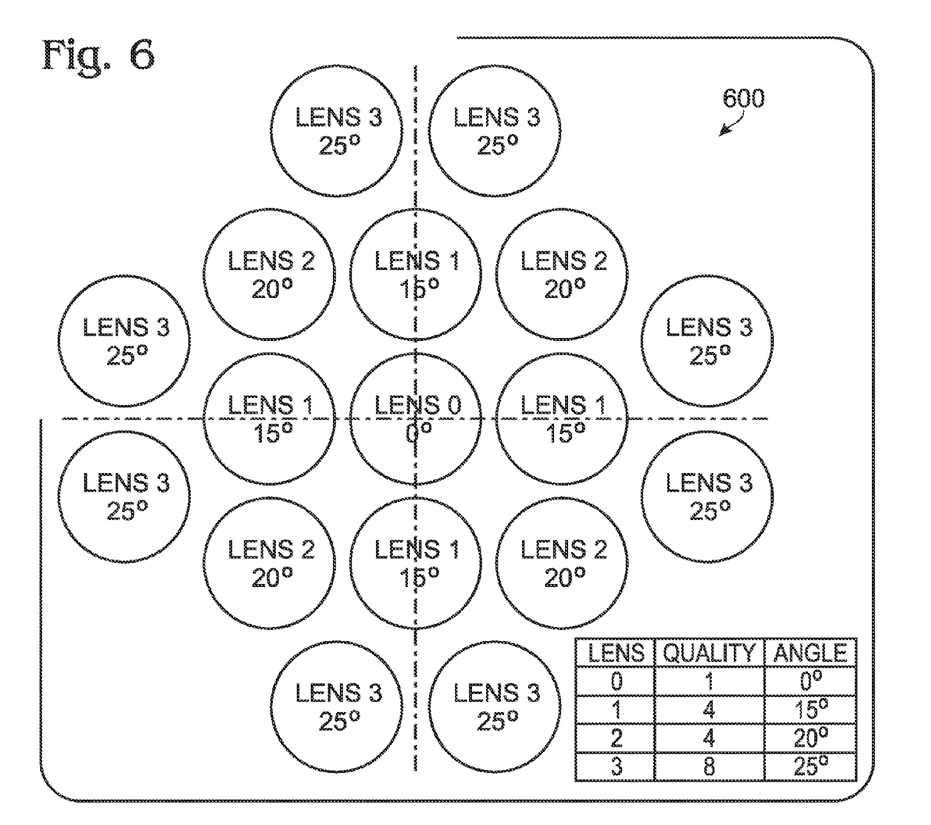
FIG. 6 shows another example embodiment of a lens array for an optical mouse.

As mentioned above, any suitable number of lenses may be used to focus any suitable number of images of spatially separate tracking surface regions onto an image sensor. In general, for a given image sensor, the use of a greater number of lenses allows a greater total area of a tracking surface to be imaged. FIG. 6 shows an embodiment of a lens array 600 comprising 17 lenses. The lenses in lens array 600 are each labeled with a "lens 0", "lens 1", "lens 2", or "lens 3" label, indicating that the array is formed from three different lens designs, each differing depending upon the distance of the lens from the center of array. This is to ensure that each lens has the same magnification with respect to the image sensor. In the embodiment of FIG. 6, a distance between each lens and lens 0 is shown in degrees. It will be understood that the depicted angles are shown for the purpose of illustration, and are not intended to be limiting in any manner.

Each lens of lens array 600 may have any suitable size. For example, in one specific embodiment, each lens has a 3 mm diameter, such that the entire lens array has a diameter of approximately 20 mm. Such an array may be used with a 400 dpi image sensor to image a total of 33.15 $mm^2$ of a tracking surface. In comparison, the same mouse utilizing a single lens may be used to image a 1.25 $mm^2$ area of the tracking surface. Therefore, the use of lens array 600 allows a much larger area of a tracking surface to be monitored for tracking features compared to a similar single lens system. This may increase a probability that a tracking feature will be found in an image data frame from the image sensor. It will be understood that the above-described lens diameters, sensor resolutions, and other values are described for the purpose of example, and are not intended to be limiting in any manner. It will further be understood that, if it is desired to view a larger area of the tracking surface, two (or more) separate lens arrays may be used in conjunction with two (or more) image sensors, such that each lens array focuses images onto a corresponding image sensor.

A lens array for an optical mouse according to the present disclosure may be formed in any suitable manner. For example, in some embodiments, a lens array may be formed from a single molded plastic part. Such a lens array may be relatively easy and inexpensive to manufacture. In other embodiments, two or more separately molded lenses or separately molded lens sub-arrays may be coupled together to form a lens array. Further, in yet other embodiments, a lens array may be made from any other suitable material than molded plastic, such as glass.

Any suitable light source may be utilized to illuminate a tracking surface for imaging via a lens array. For example, in one specific embodiment, the lens array 600 of FIG. 6 may be used in conjunction with an array of six light-emitting diodes (LEDs) for illuminating a desired area of the tracking surface. In other embodiments, either more or fewer LEDs, and/or any other suitable light source than an LED, including but not limit to lasers, may be used.

The light source may be configured to emit light of any suitable color. For example, in some embodiments, LEDs and/or lasers configured to emit blue or violet light may be used. For the purposes of discussion "blue or violet light" may be considered to be light in a wavelength range of, for example, 400-490 nm. The use of violet or blue light over other colors of light may offer various advantages. For example, violet or blue light has a higher intensity of reflection from a dielectric object (i.e. glass table surface) than longer wavelengths of visible light. This may lead to higher image contrasts relative to longer wavelengths of light, which may facilitate the imaging of tracking features on smooth surfaces. Further, violet or blue light may be able to resolve smaller tracking features than light of longer wavelengths, which also may facilitate tracking on smooth surfaces, depending upon the resolution of the image sensor used. Additionally, violet or blue light has a shorter coherence length and smaller diffraction limit than longer wavelengths of light, which also may help to improve the imaging of tracking features on a smooth surface. However, it will be appreciated that, in other embodiments, any other suitable color light than blue may be used, including other visible wavelengths and/or infrared light.

Figure 7:
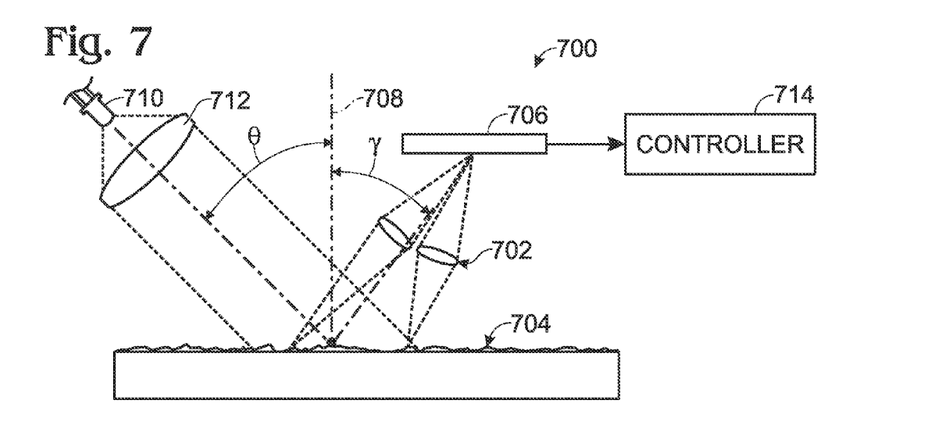
FIG. 7 shows an embodiment of a specular optical architecture for an optical mouse.
Figure 8:
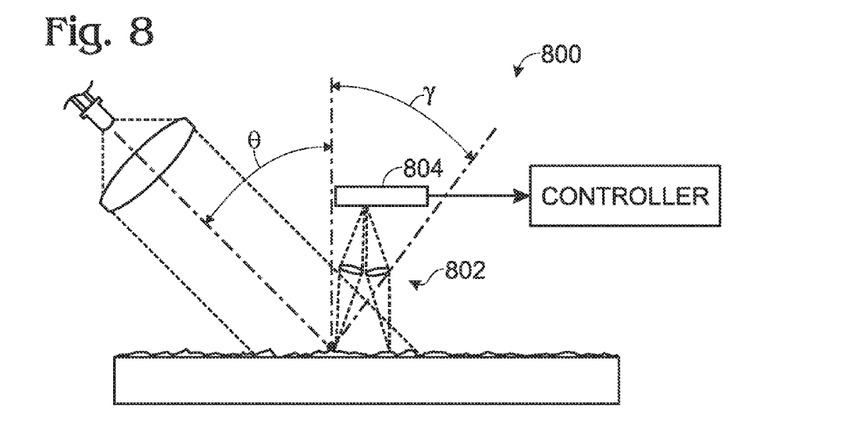
FIG. 8 shows an embodiment of an optical architecture for an optical mouse configured to detect darkfield images.
Figure 9:
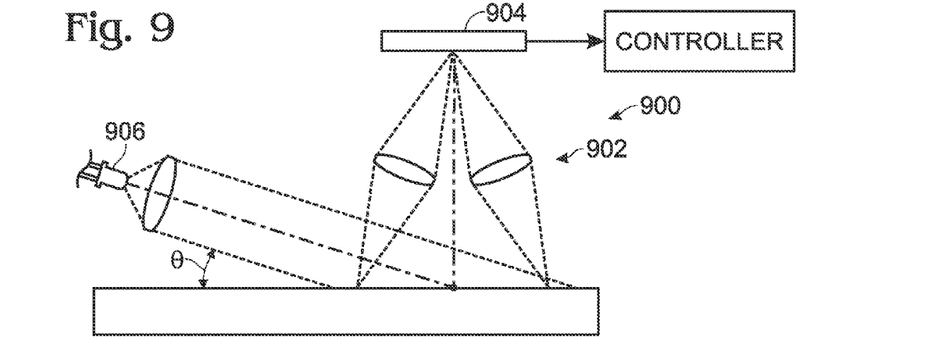
FIG. 9 shows an embodiment of an oblique architecture for an optical mouse.

An optical mouse as disclosed herein may utilize any suitable optical architecture for tracking motion on a surface. FIGS. 7-9 show three non-limiting example optical architectures. First, FIG. 7 shows a specular optical architecture 700 where a lens array 702 (illustrated schematically as two lenses) is disposed at a location configured to collect specularly reflected light for imaging. The term "specular reflection" refers to the light reflected from the tracking surface at an angle γ equal to an incident angle θ of the light with respect to the normal 708 of the tracking surface 706.

The light source 710 of FIG. 7 is depicted schematically as a single LED, but it will be understood that the light source may comprise more than one LED and/or other light emitter. Further, the optical architecture may comprise other optics, such as one or more collimating lenses (illustrated as a single collimating lens 712), disposed between the light source 710 and the tracking surface 704 for collimating light from the light source 710.

Continuing with FIG. 7, the image sensor 706 is electrically connected to a controller 714. The controller 714 is configured to acquire a plurality of time-sequenced frames of image data from the image sensor 706, and to process the image data to detect motion from the movement of one or more tracking features in the plurality of time-sequenced images of the tracking surface. The controller is further configured to output a motion signal based upon the changes in locations of the tracking features.

When configured to detect light in a specular portion of the reflected light distribution, the image sensor 706 may detect patches of specular reflection from a surface, which appear as bright patches on an image of a surface. In contrast, an obliquely-arranged detector, described below with respect to FIG. 9, is generally used to detect shadows, rather than patches of reflection, in an image of the tracking surface. Therefore, because more light reaches the image sensor 706 when the sensor is in a specular configuration than when the sensor is in an oblique configuration, the detection of an image in specularly reflected light may allow for shorter integration times, and also may allow the light source to be pulsed with less "on" time, thereby reducing the current drawn by the light source as a function of time and saving battery life. This also may allow the use of a lower power light source, which also may help to save battery life. On the other hand, the detection of an image in an oblique optical arrangement (described below) may help to avoid saturating the image detector with light. Therefore, a choice of an optical architecture for an optical mouse according to the present disclosure may depend upon other optical system characteristics and/or on a desired use environment.

FIG. 8 depicts another optical architecture, referred to as a "darkfield" optical architecture 800. Darkfield optical architecture 800 comprises a lens array 802 positioned somewhat off of the specular angle of reflection such that specularly reflected light does not reach the image sensor 804, but close enough to the specular angle of reflection that some light reflected from tracking features in the image (e.g. surface irregularities, dust, hair, etc.) does reach the image sensor 804. This type of imaging also may be referred to as "darkfield" illumination. This may help to avoid saturation of the image sensor where a large number of images are superimposed on the image sensor, as the overlaid images are primarily dark, with the tracking features appearing as lighter features over the dark background.

FIG. 9 shows yet another embodiment of an optical architecture 900. Architecture 900 may be referred to as an "oblique" optical architecture, where the lens array 902 and image sensor 904 are located at an oblique angle relative to an angle of incidence of light from the light source 906. In such a configuration, light from the light source 906 is incident on the tracking surface at a grazing angle, and light scattered off the tracking surface is detected by the obliquely arranged image sensor 904. Contrast of the surface images is enhanced by shadows created by surface height variations, allowing tracking features on the surface to be distinguished. It will be understood that the optical architectures presented in FIGS. 7-9 are shown for the purpose of example, and are not intended to be limiting in any manner.

Figure 10:
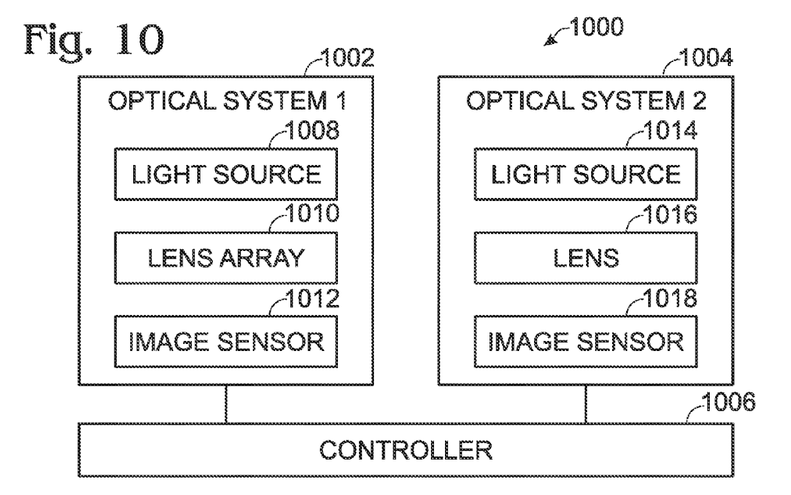
FIG. 10 shows an embodiment of an optical mouse having two optical systems for tracking on different surfaces.

On some textured surfaces with a greater density of tracking features than glass, superimposing a plurality of images of spatially different regions of the tracking surface may lead to reduced tracking performance compared to the performance on a glass surface, as total contrast used for a correlation algorithm may actually be reduced by the superimposed images. Therefore, FIG. 10 shows a block diagram of a mouse comprising two separate optical systems, shown as optical system 1 1002 and optical system 2 1004, each in electrical communication with a controller 1006. Optical system 1 1002 is configured to track movement on smooth surfaces such as glass. As such, optical system 1 includes a light source 1008, lens array 1010, and image sensor 1012, wherein the lens array 1010 is configured to focus a plurality of superimposed images onto the image sensor 1012, as described above. Optical system 2 1004 is configured to track motion on textured surfaces (e.g. wood, fabric, rubber, plastic, etc.), and as such, includes a light source 1014, a single lens 1016, and an image sensor 1018 that are separate from the light source, lens and image sensor of optical system 1 1002. Controller 1006 may be configured to determine which optical system to use for motion tracking depending upon nature of the surface on which the mouse is being used, as described in more detail below. Alternately or additionally, a user may be able to select which optical system to use via a control on the mouse or on a computing device to which the mouse is connected.

Light sources 1008 and 1014 each may comprise any suitable number of light emitting elements. For example, in one specific embodiment, light source 1 1008 may comprise six LEDs for use with a lens array 1010 comprising seventeen lenses, while light source 2 1014 may comprise a single LED for use with a single lens. It will be appreciated that other embodiments may utilize any other suitable number of LEDs and/or lasers in the light sources, and/or any other suitable number of lenses in a lens array. It may be desirable to utilize a lesser number of light emitting elements in each light source to reduce power consumption and increase battery life.

It will be understood that, instead of the two optical systems of FIG. 10, other embodiments may utilize a single set of optics that are operated in two or more different illumination modes such that a single lens (or small number of lenses) collects light in a first illumination mode, and a larger number of lenses collect light in the second illumination mode. Such illumination modes may differ, for example, in a number of LEDs or other light emitters that are illuminated for each mode.

Figure 11:
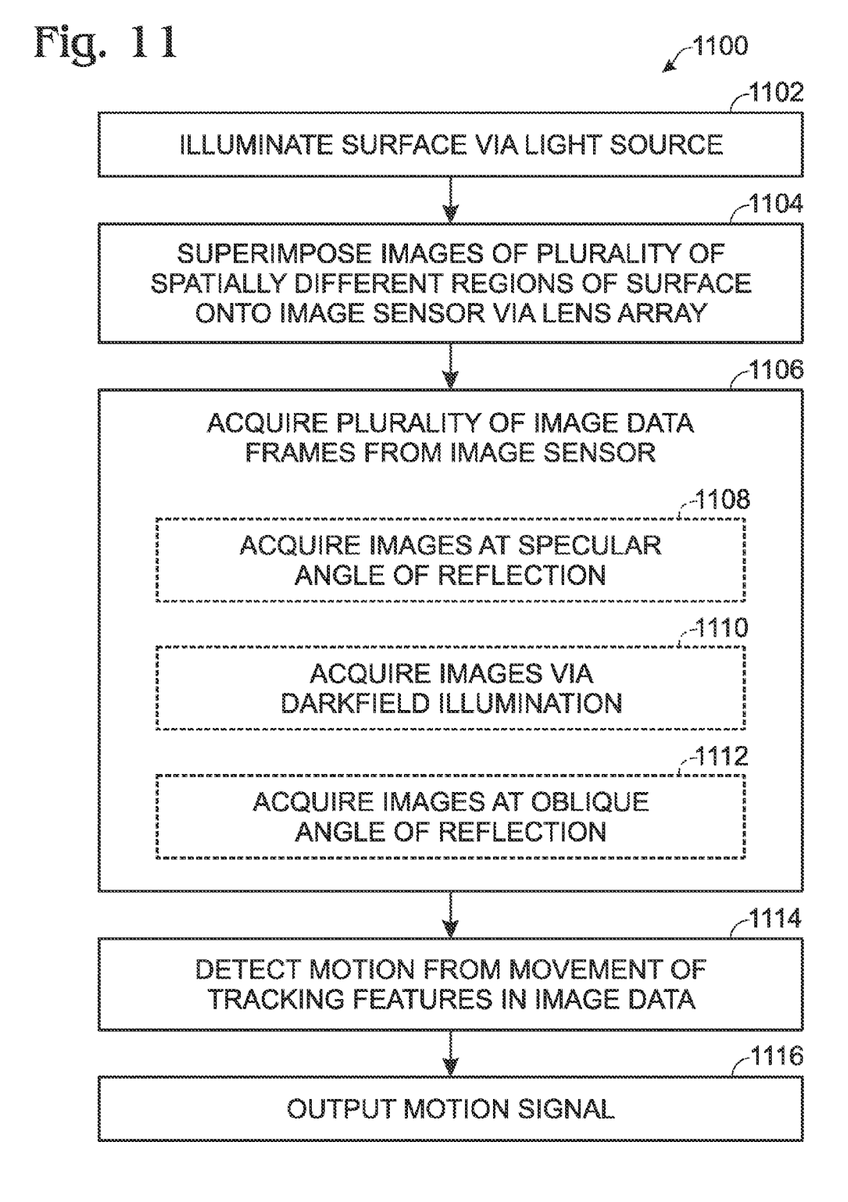
FIG. 11 shows a flow diagram depicting an embodiment of a method for tracking motion on a surface via an optical mouse.

FIG. 11 shows a flow diagram depicting an embodiment of a method 1100 for tracking motion on a surface via an optical mouse. Method 1100 comprises, at 1102, illuminating a surface via a light source, and then at 1104, superimposing images of a plurality of spatially different regions of the surface onto an image sensor via a lens array. As described above, any suitable light source and lens array may be used. For example, the light source may comprise one or more LEDs and/or lasers, and may be configured to output light of any suitable color, including but not limited to light in a wavelength range of 400-490 nm, corresponding generally to violet and blue light. Likewise, the lens array may be configured to focus any suitable number of superimposed images of spatially different areas of the tracking surface on the image sensor.

Continuing with FIG. 11, method 1100 next comprises, at 1106, acquiring a plurality of time-sequenced frames of image data from the image sensor. The light source, image sensor and lens array may have any suitable arrangement with respect to the tracking surface and to each other to acquire images. For example, the images may be acquired at a specular angle of reflection, via a darkfield illumination, or at an oblique angle of reflection, as shown at 1108, 1110 and 1112, respectively. Examples of each of these optical architectures are described above with reference to FIGS. 7, 8 and 9, respectively.

Next, method 1100 comprises, at 1114, detecting motion of the mouse from the movement of one or more tracking features in the image data, and then, at 1116, outputting a motion signal. In this manner, motion may be tracked on surfaces that are too smooth for reliable tracking with a conventional mouse.

As mentioned above, on some textured surfaces, superimposing a plurality of images of the tracking surface onto an image sensor may lead to less satisfactory performance than the use of a single image due to the relatively high density of tracking features on such surfaces. Therefore, some embodiments may comprise dual optical systems, as described above with reference to FIG. 10, such that one optical system may be used to track motion on smoother surfaces, and another may be used to track motion on rougher surfaces.

Figure 12:
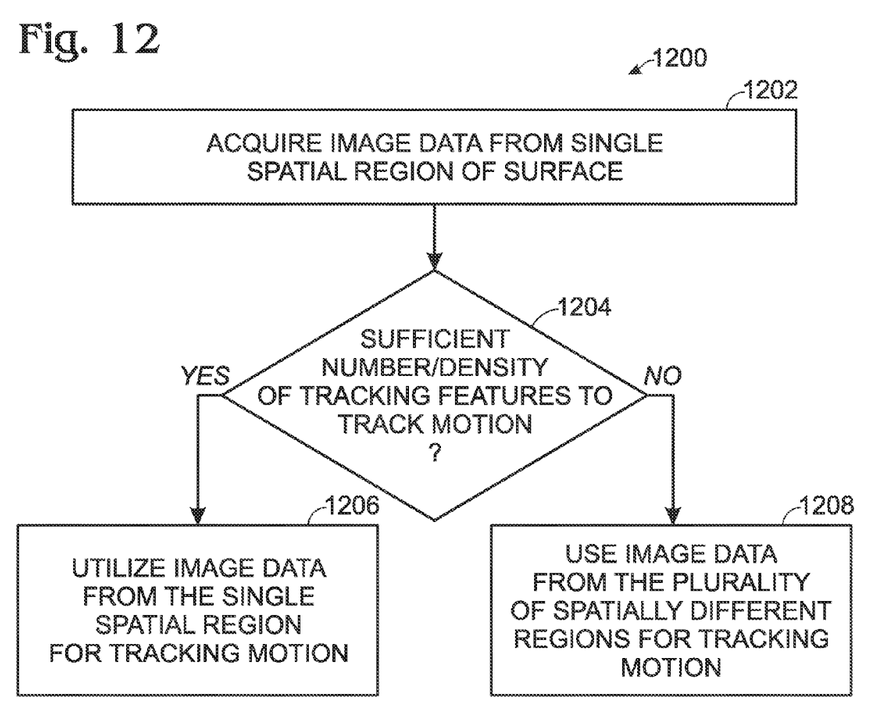
FIG. 12 shows a flow diagram depicting another embodiment of a method for tracking motion on a surface via an optical mouse.

FIG. 12 shows an embodiment of a method 1200 for determining which of two optical systems in a dual optical system mouse to use for tracking motion on a current surface. Method 1200 first comprises, at 1202, acquiring image data from an optical system configured to image a single spatial region of a tracking surface on an image sensor. Next, method 1200, comprises, at 1204, determining if there is a sufficient number, density or other quantity of tracking features in the image data to allow motion to be reliably tracked. If so, then, at 1206, it is determined to utilize data acquired from a single spatial region (e.g. gathered by optical system 2 1004 of FIG. 10, or gathered via a first illumination mode of a multi-lens optical system) on the tracking surface to track motion. On the other hand, if the number, density or other quantity of tracking features is too low to reliably track motion, then it is determined, at 1208, to use image data from a plurality of spatially different regions of the tracking surface (e.g. gathered by optical system 1 1002 of FIG. 10, or gathered via a second illumination mode of a multi-lens optical system) to track motion, as described above. It will be understood that, in other embodiments, a user may be able to select which tracking mode to use via a control on the mouse or on a computing device connected to the mouse.

It will be understood that the configurations and/or approaches for tracking motion on a surface described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An optical mouse, comprising:
a light source configured to illuminate a tracking surface;
an image sensor;
an array of lenses configured to superimpose a plurality of images of spatially different areas of the tracking surface onto a same region of the image sensor; and
a controller configured to receive a plurality of frames of image data from the image sensor, to detect motion of the mouse on the tracking surface from movement of one or more tracking features in the plurality of frames of image data, and to output a motion signal.

2. The optical mouse of claim 1, wherein the light source is a first light source, the image sensor is a first image sensor, and the array of lenses is a first lens system, wherein the first light source, the first image sensor, and the first lens system are included in a first optical system, and further comprising:
a second optical system including
a second light source configured to illuminate the tracking surface;
a second image sensor; and
a second lens system configured to focus an image of a single area of the tracking surface on the second image sensor; and
a controller,
wherein the controller is configured to acquire one or more frames of image data via the second optical system, to determine whether to use the first optical system or the second optical system to track motion based upon the one or more frames of image data, and then to track motion with the first optical system or second optical system and output a corresponding motion signal.

3. The optical mouse of claim 1, wherein the light source comprises a plurality of light emitting diodes.

4. The optical mouse of claim 1, wherein the light source is configured to output light in a wavelength range of 400-490 nm.

5. The optical mouse of claim 1, wherein the array of lenses is configured to form a darkfield image on the image sensor.

6. The optical mouse of claim 1, wherein the image sensor is located at a specular angle of reflection relative to the light source and tracking surface.

7. The optical mouse of claim 1, wherein the image sensor is located at an oblique angle to the light source.

8. The optical mouse of claim 1, wherein the array of lenses comprises seven or more lenses configured to focus seven or more superimposed images on the image sensor.

9. An optical mouse, comprising:
a first optical system comprising a first light source, a first image sensor, and a first lens system comprising an array of lenses configured to focus a plurality of superimposed images of spatially different areas of a tracking surface onto a same region of the first image sensor, the array of lenses including two or more lenses comprising a first lens positioned at a first angle with respect to the tracking surface and a second lens positioned at a second angle with respect to the tracking surface, the first angle being different than the second angle;
a second optical system comprising a second light source, a second image sensor, and a second lens system configured to focus a single image onto the second image sensor; and
a controller configured to acquire one or more frames of image data via the second optical system, to determine whether to use the first optical system or the second optical system to track motion based upon the one or more frames of image data, and then to track motion with the first optical system or second optical system and output a corresponding motion signal.

10. The optical mouse of claim 9, wherein the first light source comprises a plurality of blue or violet light emitting diodes, and wherein the first angle is 15° and the second angle is 20°.

11. The optical mouse of claim 9, wherein the second light source comprises a blue or violet light emitting diode.

12. The optical mouse of claim 9, wherein one or more of the first optical system and the second optical system has a specular configuration.

13. The optical mouse of claim 9, wherein one or more of the first optical system and the second optical system has an oblique configuration.

14. The optical mouse of claim 9, wherein one or more of the first optical system and the second optical system are configured to acquire a darkfield image.

15. The optical mouse of claim 9, wherein the array of lenses comprises seven or more lenses configured to focus seven or more superimposing images on the second image sensor.

16. A method of tracking motion on a surface, comprising:
illuminating the surface via a light source;
superimposing images of a plurality of spatially different regions of the surface onto a same region of an image sensor via an array of lenses, the array of lenses including two or more lenses positioned at different angles with respect to the surface;
acquiring a plurality of frames of image data from the image sensor;
detecting one or more tracking features in the frames of image data; and
outputting a motion signal based upon the motion of the tracking features in the frames of image data.

17. The method of claim 16, further comprising, before superimposing images of the plurality of spatially different regions of the surface onto the image sensor, acquiring one or more frames of image data from a single spatial region of the surface, and then determining whether to utilize image data from the single spatial region or from the plurality of spatially different regions based upon the one or more frames of image data from the single spatial region.

18. The method of claim 17, wherein the image data from the single spatial region is gathered via a first optical system, and the image data from the plurality of spatially different regions is acquired via a second optical system.

19. The method of claim 17, wherein the image data from the single spatial region is gathered via a first illumination mode of the light source, and wherein the image data from the plurality of spatially different regions is acquired via a second illumination mode of the light source.

20. The method of claim 16, wherein the light source is configured to output light in a wavelength range of 400-490 nm.

* * * * *